US012784012B2

(12) United States Patent
Bogu et al.

(10) Patent No.: US 12,784,012 B2
(45) Date of Patent: Nov. 3, 2026

(54) AUTOMATED TELLER MACHINE GENERATED TANGIBLE STABLECOIN

(71) Applicant: Bank of America Corporation, Charlotte, NC (US)

(72) Inventors: Sivakumar Bogu, Telangana (IN); Frenchy Thomas, Chennai (IN); Daris Machado, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/184,107

(22) Filed: Apr. 21, 2025

(65) Prior Publication Data

US 2026/0330436 A1 Oct. 22, 2026

(51) Int. Cl.

| | |
|---|---|
| ***G06Q 20/06*** | (2012.01) |
| ***G06Q 20/10*** | (2012.01) |
| ***G06Q 20/20*** | (2012.01) |

(52) U.S. Cl.

CPC ....... *G06Q 20/065* (2013.01); *G06Q 20/1085* (2013.01); *G06Q 20/204* (2013.01)

(58) Field of Classification Search

CPC . G06Q 20/065; G06Q 20/1085; G06Q 20/204

See application file for complete search history.

(56) References Cited

U.S. PATENT DOCUMENTS

| | | | | |
|---|---|---|---|---|
| 7,904,713 | B1 * | 3/2011 | Zajkowski | H04L 9/3263 713/168 |
| 10,916,085 | B2 * | 2/2021 | Whytock | G07D 11/40 |
| 2008/0203150 | A1 * | 8/2008 | Royce-Winston | G07F 19/202 235/379 |
| 2019/0236561 | A1 * | 8/2019 | Hamilton | G06Q 20/065 |
| 2020/0364963 | A1 * | 11/2020 | S. | G06Q 20/204 |
| 2021/0118052 | A1 * | 4/2021 | Walser | G06F 9/547 |
| 2023/0385812 | A1 * | 11/2023 | Chae | G06Q 20/381 |
| 2025/0097178 | A1 * | 3/2025 | Korowajczuk | G06Q 20/0855 |

FOREIGN PATENT DOCUMENTS

| | | | |
|---|---|---|---|
| JP | 7378451 | B2 | 11/2023 |

* cited by examiner

*Primary Examiner* — Michael Jared Walker

(74) *Attorney, Agent, or Firm* — Banner & Witcoff, Ltd.

(57) ABSTRACT

Arrangements for generating tangible stablecoin via an ATM are provided. In some examples, a computing platform may receive, via an ATM, a request to withdraw currency in the form of tangible stablecoin. The request may include an amount of currency that may be identified in fiat currency. The platform may determine an amount of stablecoin corresponding to the requested amount and may retrieve a generic stablecoin bill from a storage area. In some examples, the generic stablecoin bill might not include any denomination and may include a unique identifier that may be machine-readable. The platform may associate the determined denomination of stablecoin with the retrieved generic stablecoin bill, as well as the user requesting the stablecoin bill. The associated data may be stored in a distributed ledger. The stablecoin bill associated with the denomination and the user may be dispensed to the user via a dispensing slot in the ATM.

20 Claims, 10 Drawing Sheets

AUTOMATED TELLER MACHINE GENERATED TANGIBLE STABLECOIN

BACKGROUND

Aspects of the disclosure relate to electrical computers, systems, and devices for generating tangible stablecoin at, for instance, an automated teller machine (ATM).

Fiat currency is used in every country around the world. However, there are drawbacks to the use of fiat currency. For instance, fiat currency is generally untraceable. Because each bill is not owned by or associated with anyone, it cannot be traced and, if lost, is unlikely to be recovered. Another drawback of fiat currency may come through the use of ATMs. Threat actors are always identifying new ways to obtain funds from an ATM. Because the funds are fiat currency and untraceable, it can be difficult to recover any losses from an ATM. Further, money laundering and counterfeiting are prominent crimes in countries around the world.

Further, various crypto currencies have become popular as a traceable form of currency. However, crypto currency generally does not include a physical coin or note and might not be redeemable as easily as fiat currency.

Accordingly, it may be advantageous to generate a secure, traceable currency, such as a crypto currency such as stablecoin, for use in a manner similar to fiat currency but that is associated with a user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with providing on-demand physical currency that is traceable.

In some examples, a computing platform may receive a request to withdraw currency in the form of tangible stablecoin bills or notes. The request may be received via an automated teller machine (ATM). The request may include an amount of currency that may, in some examples, be identified in fiat currency. The computing platform may determine an amount of stablecoin corresponding to the requested amount. The computing platform may retrieve a generic stablecoin bill from a storage area. In some examples, the generic stablecoin bill might not include any denomination and may include a unique identifier that may be machine-readable.

The computing platform may associate the determined denomination of stablecoin with the retrieved generic stablecoin bill, as well as the user requesting the stablecoin bill. The associated data may be stored in a distributed ledger. The stablecoin bill associated with the denomination and the user may be dispensed to the user via a dispensing slot in the ATM for redemption in a manner similar to fiat currency.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, while the use of fiat currency is common worldwide, there are drawbacks to using fiat currency. For instance, fiat currency is generally not traceable to an owner. Accordingly, once lost it may be lost forever. Further, automated teller machines (ATMs) that dispense fiat currency are often prone to unauthorized activity (e.g., shimming, skimming, duplicate cards to withdraw funds, and the like). Accordingly, if an unauthorized user uses these techniques to gain unauthorized access to a user account, the unauthorized user may be able to withdraw funds that might not be restored to the user. Accordingly, an alternative to fiat currency may be advantageous.

The arrangements described herein are directed to using existing ATMs that may receive and dispense fiat currency to also generate or mint and dispense physical stablecoin notes. For instance, ATMs may be configured to store generic stablecoin notes or bills that may be associated with different users and/or denominations upon request. The notes may be dispensed to a requesting user and a unique identifier, user and denomination associated with each note may be stored in a distributed ledger. The stablecoin notes may then be redeemed at retailers, merchants, or the like, in a manner similar to redemption of fiat currency.

These and various other arrangements will be discussed more fully below.

Figure 1A:
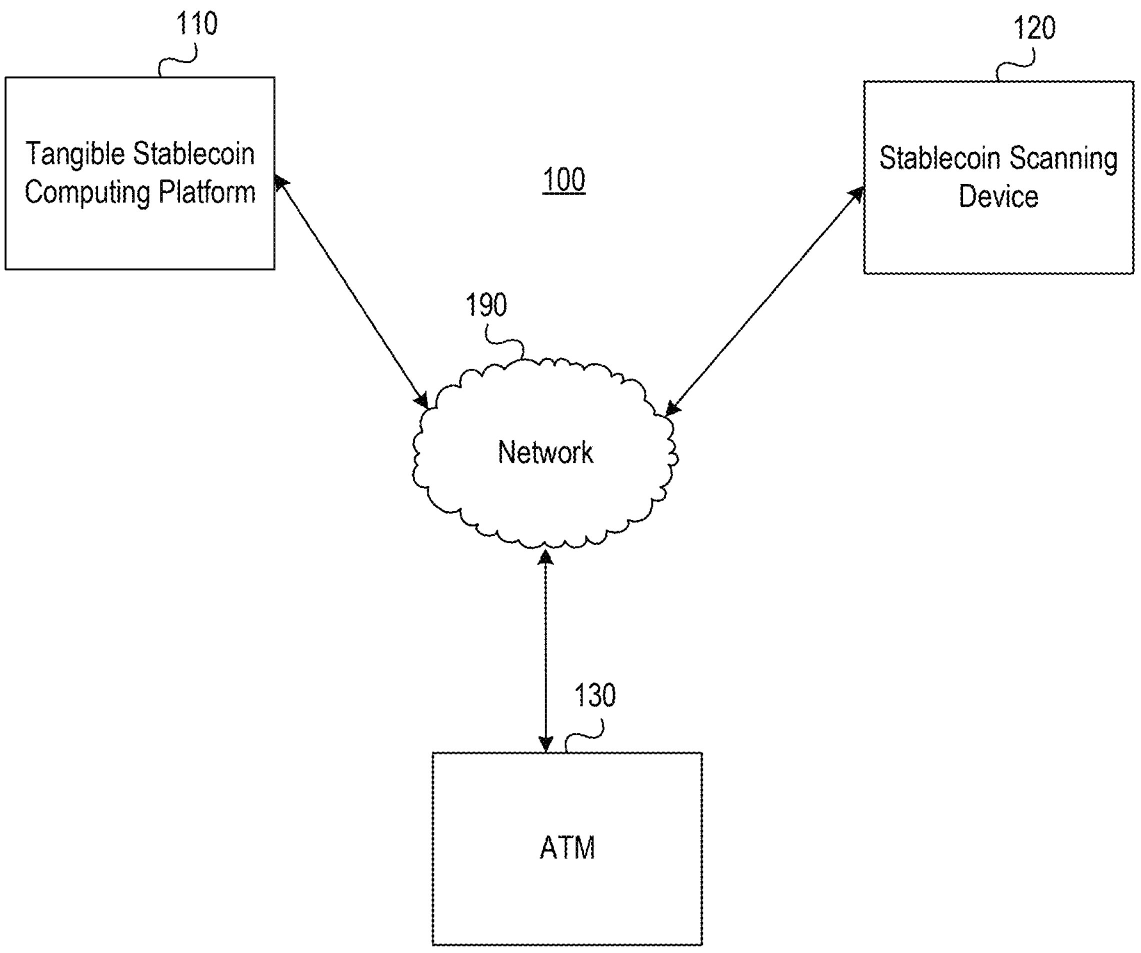
FIGS. 1A-1B depict an illustrative computing environment for generating tangible stablecoin via an ATM in accordance with one or more aspects described herein.
Figure 1B:
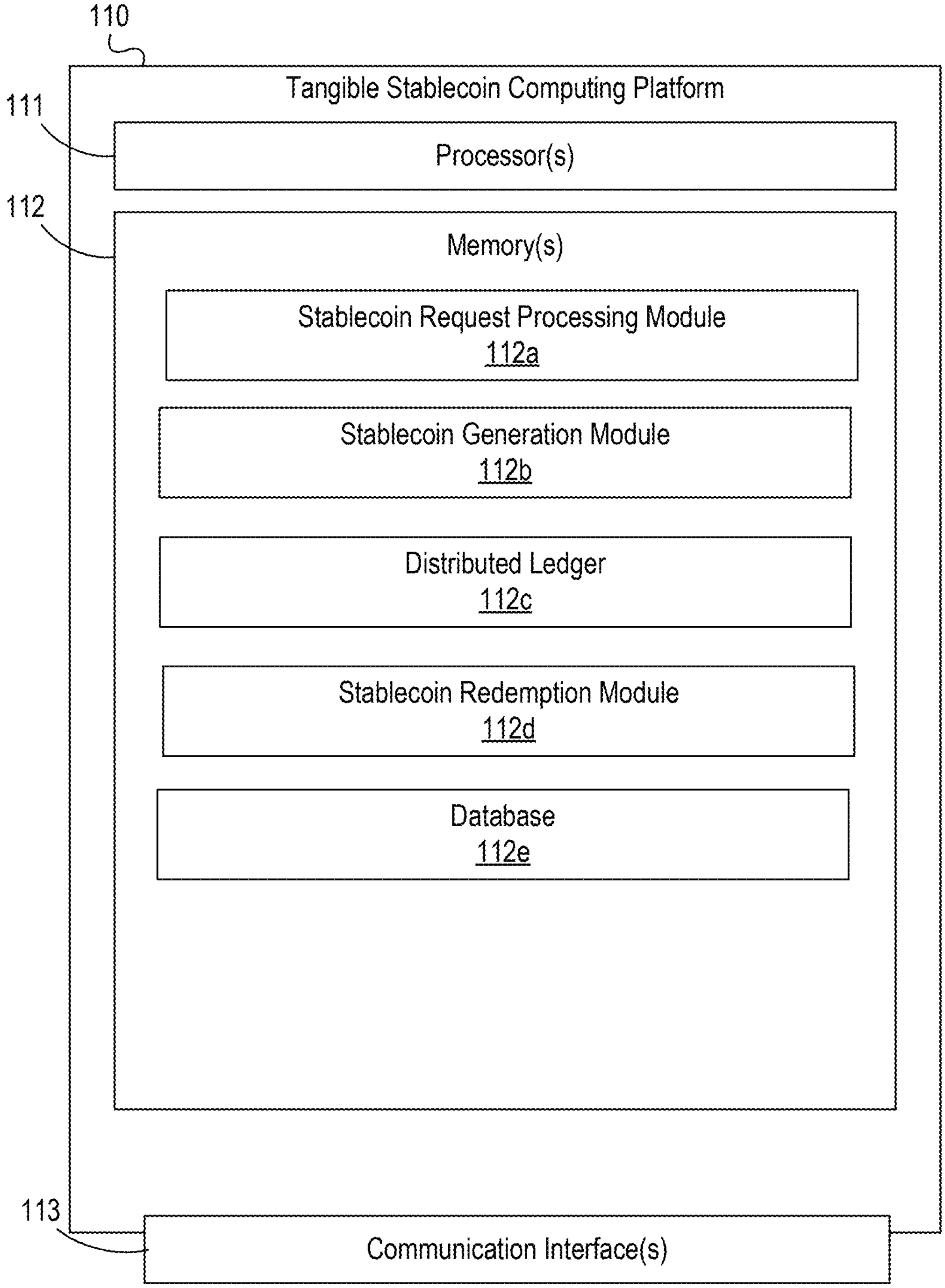

FIGS. 1A-1B depict an illustrative computing environment and devices for generating tangible stablecoin at an automated teller machine (ATM) in accordance with one or more aspects described herein. Referring to FIG. 1A, computing environment 100 may include one or more computing devices and/or other computing systems. For example, computing environment 100 may include tangible stablecoin computing platform 110, stablecoin scanning device 120, and automated teller machine (ATM) 130.

Although one stablecoin scanning device 120 and one ATM are shown, any number of systems or devices may be used without departing from the invention.

Further, although they are shown in FIG. 1A as separate devices, tangible stablecoin computing platform 110 and ATM 130 may be part of a same device.

Tangible stablecoin computing platform 110 may be or include one or more computer components (e.g., servers, server blade, processor, memory, and the like) and may be configured to perform intelligent, dynamic, real-time minting, printing or generation of table stablecoin. For instance, tangible stablecoin computing platform 110 may receive, from, for instance, an automated teller machine (ATM) such as ATM 130, a request for stablecoin. In some examples, the request may include an amount identified in fiat currency (e.g., a user may request $50 in stablecoin). Tangible stablecoin computing platform 110 may convert the requested amount of fiat currency to stablecoin and may generate a signal causing ATM to retrieve, from a storage cartridge of generic stablecoin bills, a first generic stablecoin bill. The signal may further cause the ATM to retrieve an identifier associated with the first generic stablecoin bill and mint, print or generate the requested tangible stablecoin in the denomination corresponding to the requested amount of fiat currency. The signal may be transmitted to the ATM 130 and executed causing the ATM 130 to produce and distribute, to the user, a tangible stablecoin bill in the denomination corresponding to the requested amount of fiat currency.

Further, tangible stablecoin computing platform 110 may record, in a distributed ledger, the generated tangible stablecoin. For instance, tangible stablecoin computing platform 110 may modify a distributed ledger (e.g., blockchain or the like) to include a new block including the tangible stablecoin identifier associated with the generated tangible stablecoin bill, the denomination associated with the generated tangible stablecoin bill and a user identifier associated with the user requesting the tangible stablecoin bill.

In some examples, the distributed ledger may be synced with one or more additional distributed ledgers hosted by, for instance, a centralized banking system or institution, or the like.

ATM 130 may be or include one or more computer components (e.g., servers, server blade, processor, memory, and the like) and may be configured to process user transactions, such as deposits, withdrawals of fiat currency, check cashing, balance transfer, and the like. The ATM may include a display and one or more input devices (e.g., touch screen, key pad, or the like). The ATM 130 may include a card reader used to initiate a transaction by a user having an authorized card. ATM 130 may further include internal storage-providing cartridges for fiat currency received by the ATM 130 via deposits, fiat currency to be distributed to users via withdrawals, as well as one or more additional cartridges storing generic tangible stablecoin bills. Each bill may include a unique identifier that may or might not be visible to the human eye. The ATM 130 may be configured to receive instructions from tangible stablecoin computing platform 110 to associate a denomination and user identifier with the identifier of a retrieved generic stablecoin bill and distributed to a tangible stablecoin bill associated with the denomination and the user to the user.

Stablecoin scanning device 120 may be or include one or more computer components (e.g., processor, memory, and the like) and or may be or include one or more computing devices (e.g., laptop computers, desktop computers, mobile devices, tablet devices, or the like) and may be configured to scan, for instance, the unique identifier associated with the tangible stablecoin bill. The unique identifier may be a machine-readable code that may be captured or read by the stablecoin scanning device 120 which may, in some examples, be a point-of-sale system at a retailer, tablet, smart phone or the like, executing an application (e.g., an application of the enterprise organization implementing the tangible stablecoin computing platform 110) configured for scanning and processing tangible stablecoin bills. The stablecoin scanning device 120 may include an image capture device or other machine-readable code scanning device and may process one or more transactions using the tangible stablecoin bill by retrieving, from the distributed ledger, tangible stablecoin bill validity data and confirming an identity of the user. Accordingly, the system may allow for traceability of funds while maintaining the convenience of use of fiat currency.

As mentioned above, computing environment 100 also may include one or more networks, which may interconnect one or more of tangible stablecoin computing platform 110, stablecoin scanning device 120, and/or ATM 130. For example, computing environment 100 may include network 190. Network 190 may, in some examples, be a private network and include one or more sub-networks (e.g., Local Area Networks (LANs), Wide Area Networks (WANs), or the like). In some examples, network 190 may be a public network or may include a public network and private network in communication with each other. Network 190 may interconnect one or more computing devices associated with the organization and/or external to the organization. For example, tangible stablecoin computing platform 110, stablecoin scanning device 120, and/or ATM 130 may be connected via network 190.

Referring to FIG. 1B, tangible stablecoin computing platform 110 may include one or more processors 111, memory 112, and communication interface 113. A data bus may interconnect processor(s) 111, memory 112, and communication interface 113. Communication interface 113 may be a network interface configured to support communication between tangible stablecoin computing platform 110 and one or more networks (e.g., network 190, or the like). Memory 112 may include one or more program modules having instructions that when executed by processor(s) 111 cause tangible stablecoin computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of tangible stablecoin computing platform 110 and/or by different computing devices that may form and/or otherwise make up tangible stablecoin computing platform 110.

For example, memory 112 may have, store and/or include stablecoin request processing module 112*a*. Stablecoin request processing module 112*a* may store instructions and/or data that may cause or enable the tangible stablecoin computing platform 110 to receive, via an ATM, a request to dispense tangible stablecoin (e.g., mint or generate a physical stablecoin note or bill). Stablecoin request processing module 112*a* may evaluate the request, which may include an amount identified in fiat currency, and convert the amount of fiat currency to stablecoin.

Tangible stablecoin computing platform 110 may further have, store and/or include stablecoin generation module 112*b*. Stablecoin generation module 112*b* may store instructions and/or data that may cause or enable the tangible stablecoin computing platform 110 to retrieve, from a cartridge or other storage location within the ATM, a generic stablecoin bill or note (e.g., a physical stablecoin note or bill having no associated denomination). The generic stablecoin note or bill may include a unique identifier associated with that note or bill that may be machine-readable. In some examples, the unique identifier might not be visible to the human eye. Stablecoin generation module 112*b* may associate the determined amount of stablecoin with the generic note or bill and associated unique identifier. In some examples, stablecoin generation module 112*b* may dispense or cause to be dispensed, the generated stablecoin note or bill with the associated denomination via the ATM (e.g., via a note or bill dispensing slot in the ATM).

Tangible stablecoin computing platform 110 may further have, store and/or include distributed ledger 112*c*. Distributed ledger 112*c* may store instructions and/or data that may cause or enable the tangible stablecoin computing platform 110 to store generated stablecoin notes or bills and associated information such as a requesting user, associated denomination, unique identifier associated with the note or bill, and the like. In some examples, a new block may be generated and added to the distributed ledger for each generated stablecoin note or bill. Accordingly, each generated stablecoin note or bill may be traceable and associated with a particular user to avoid unauthorized use. In some examples, distributed ledger 112*c* may sync with one or more additional distributed ledgers (e.g., one or more distributed ledgers associated with, for instance, a central financial institution, regulatory institution, or the like).

Tangible stablecoin computing platform 110 may further have, store and/or include stablecoin redemption module 112*d*. Stablecoin redemption module 112*d* may store instructions and/or data that may cause or enable the tangible stablecoin computing platform 110 to receive, from a stablecoin scanning device 120 (e.g., at a retailer, or the like) a request to redeem the generated stablecoin note or bill. Stablecoin redemption module 112*d* may retrieve, from the distributed ledger 112*c*, details associated with the stablecoin note or bill or verify the validity of the note or bill and confirm ownership (e.g., that the user requesting redemption is the owner associated with the bill or note in the distributed ledger 112*c*). Responsive to validating the bill or note, the stablecoin redemption module 112*d* may authorize redemption of the stablecoin note or bill.

Tangible stablecoin computing platform 110 may further have, store and/or include a database 112*e*. Database 112*e* may store data related to generated stablecoin notes or bills, requests for stablecoin, user and associated transactions, and/or any other data to perform the functions of tangible stablecoin computing platform 110.

FIGS. 2A-2E depict one example illustrative event sequence for generating tangible stablecoin at an ATM in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
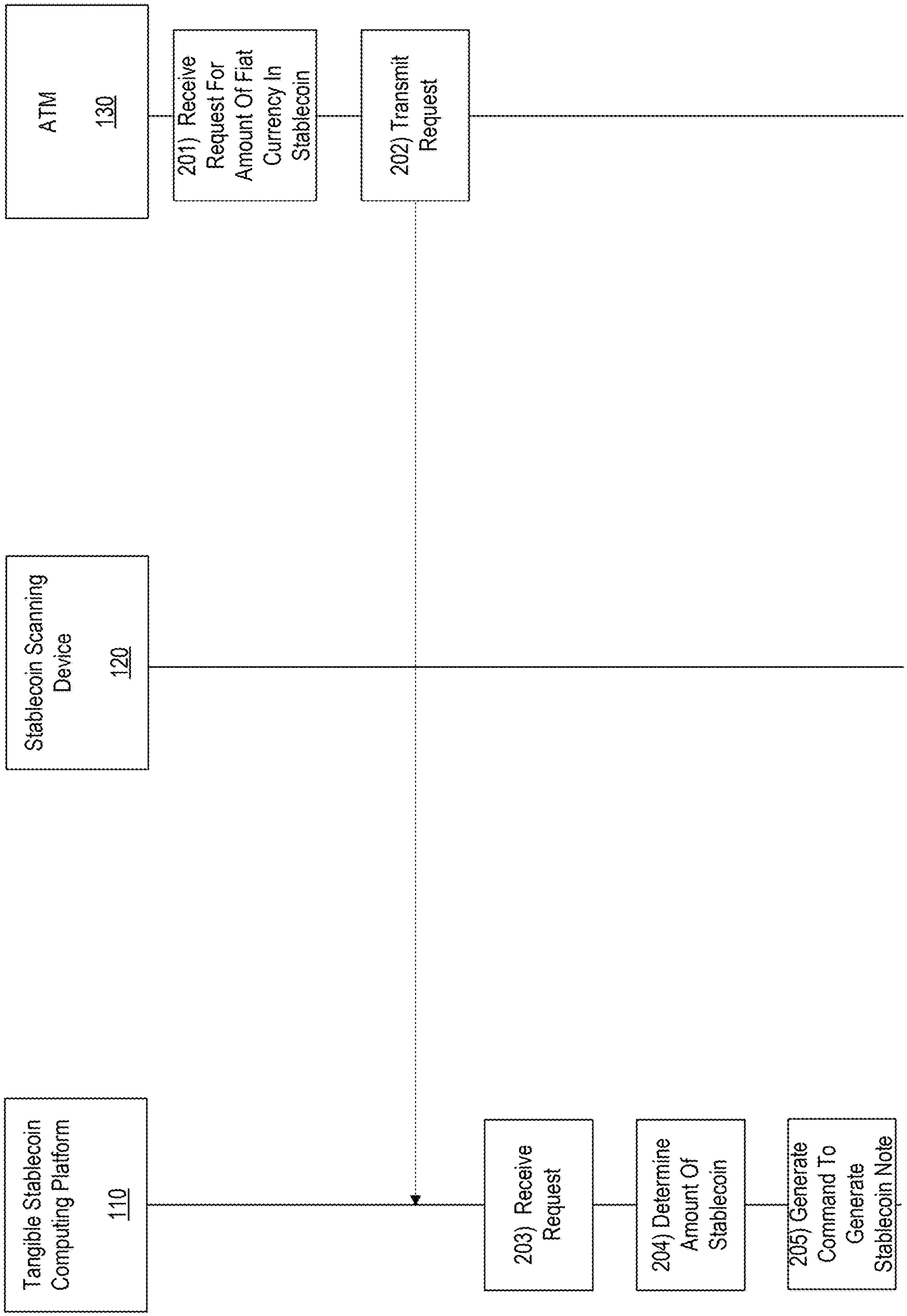
FIGS. 2A-2E depict an illustrative event sequence for generating tangible stablecoin via an ATM in accordance with one or more aspects described herein.
Figure 4:
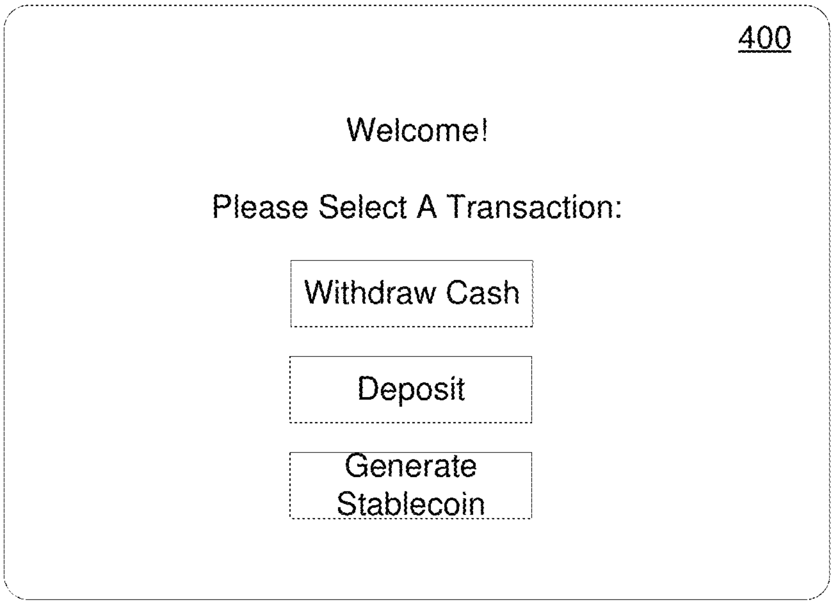
FIG. 4 illustrates an example user interface that may be generated in accordance with one or more aspects described herein.

With reference to FIG. 2A, at step 201, ATM 130 may receive a request for an amount of funds dispensed in stablecoin. For instance, a user may initiate a withdrawal transaction at ATM 130 (e.g., authenticate, request funds, and the like) and may request an amount of funds to be dispensed in tangible stablecoin, rather than fiat currency. In some examples, the amount of funds may be identified in fiat currency (e.g., $XX.XX USD, $YY.YY CAD, or the like). FIG. 4 illustrates one example user interface 400 that may be used to request stablecoin. Interface 400 may be displayed by a display of an ATM 130 and the user may select an option to generate stablecoin, which may then be dispensed by the ATM in the form of a physical or tangible stablecoin note or bill.

At step 202, ATM 130 may transmit or send the request to the tangible stablecoin computing platform 110. Although they ATM 130 and tangible stablecoin computing platform 110 are shown as separate devices in FIGS. 2A-2E, in some examples, the tangible stablecoin computing platform 110 may be part of the ATM 130 (e.g., a same device).

At step 203, tangible stablecoin computing platform 110 may receive the request for funds transmitted by the ATM 130.

At step 204, tangible stablecoin computing platform 110 may identify an amount of stablecoin corresponding to the requested amount of fiat currency. For instance, tangible stablecoin computing platform 110 may convert the requested amount of fiat currency to stablecoin using current (e.g., real-time or near real-time rates). In some examples, one stablecoin may correspond to one unit of fiat currency. Accordingly, if a user requests $50 US dollars, tangible stablecoin computing platform 110 may convert that to 50 stablecoin. In some examples, the requested amount may be identified in stablecoin and, in those examples, step 204 may be omitted.

At step 205, tangible stablecoin computing platform 110 may generate a command or instruction causing the ATM 130 to generate a tangible stablecoin note or bill. For instance, ATM 130 may be configured to not only receive and dispense fiat currency but also to generate physical stablecoin notes or bills, similar to fiat currency, but that are traceable to an associated user, have a unique identifier, and the like.

Figure 2B:
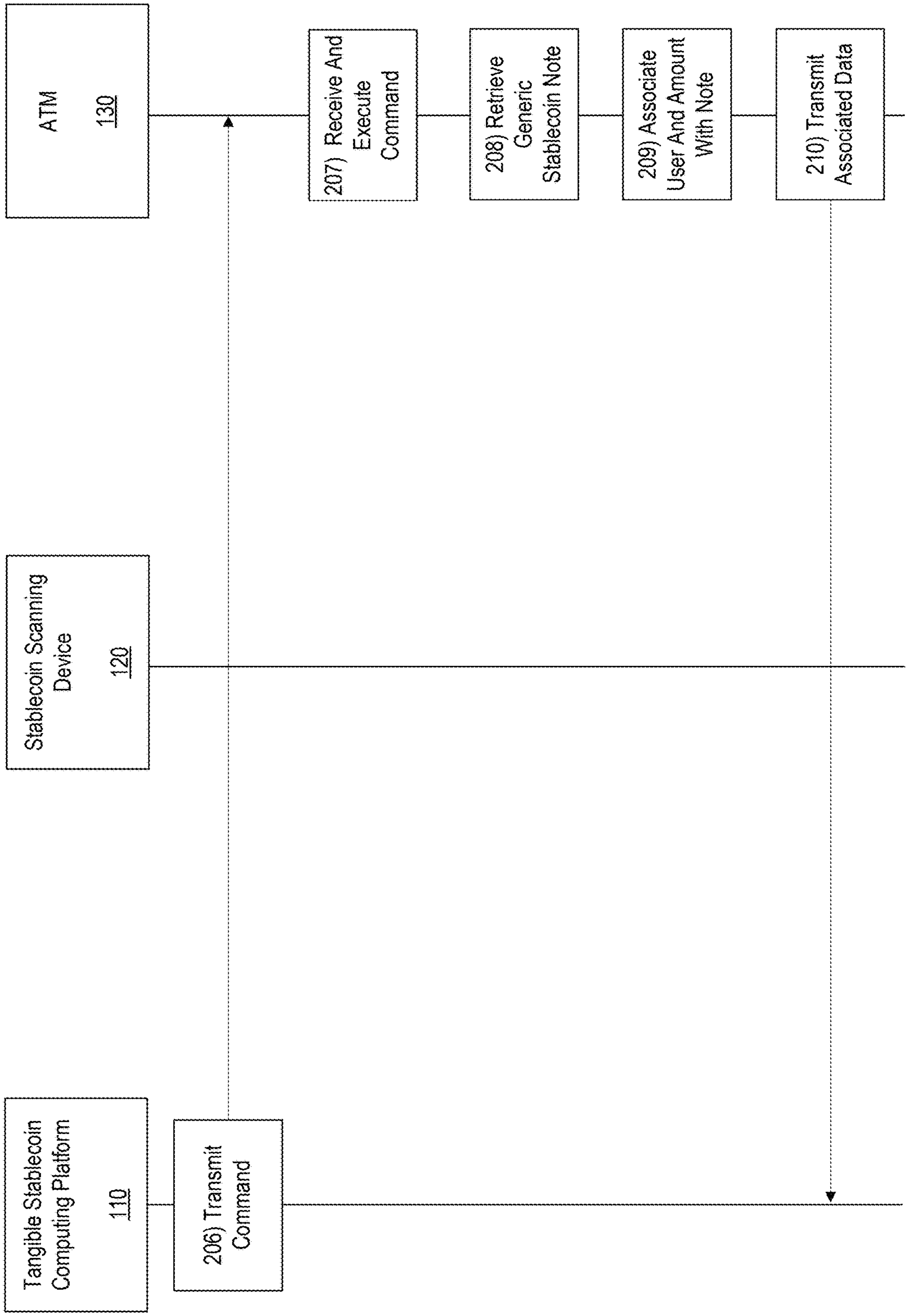

With reference to FIG. 2B, at step 206, tangible stablecoin computing platform 110 may transmit or send the generated command or instruction to the ATM 130.

At step 207, ATM 130 may receive and execute the commend to generate the tangible stablecoin bill or note. For instance, at step 208, ATM 130 may retrieve, from a storage cartridge or other storage device within the ATM 130, a generic stablecoin note or bill. The generic stablecoin note or bill may include a unique identifier associated with that particular note or bill. The unique identifier may be a machine-readable code and, in some examples, the unique identifier might not be visible to the human eye. The generic stablecoin note or bill might not include any associated denomination.

At step 209, ATM 130 may associate the determined amount of denomination of stablecoin to fulfill the request with the retrieved generic stablecoin note or bill. For instance, ATM 130 may associate the determined denomination with the user requesting the stablecoin note or bill and the unique identifier associated with the generic stablecoin note or bill that is now associated with the determined denomination. After associating the data with the generic stablecoin bill or note, a labeled stablecoin bill or note may be generated including the associated data. In some examples, associating the data may also cause generation of a smart contract that may be stored in a distributed ledger (e.g., along with the labeled stablecoin data) and may include software code and/or algorithms that may be executed in the distributed ledger upon detection of a triggering event. In some examples, generating the labeled stablecoin note or bill may include printing or otherwise displaying the associated denomination on the labeled stablecoin bill or note.

At step 210, ATM 130 may transmit or send, to the tangible stablecoin computing platform 110, the associated data. For instance, ATM 130 may transmit or send the user identifier, unique identifier of the generated tangible stablecoin note or bill associated with the user, and the denomination associated with the stablecoin note or bill to the tangible stablecoin computing platform 110.

Figure 2C:
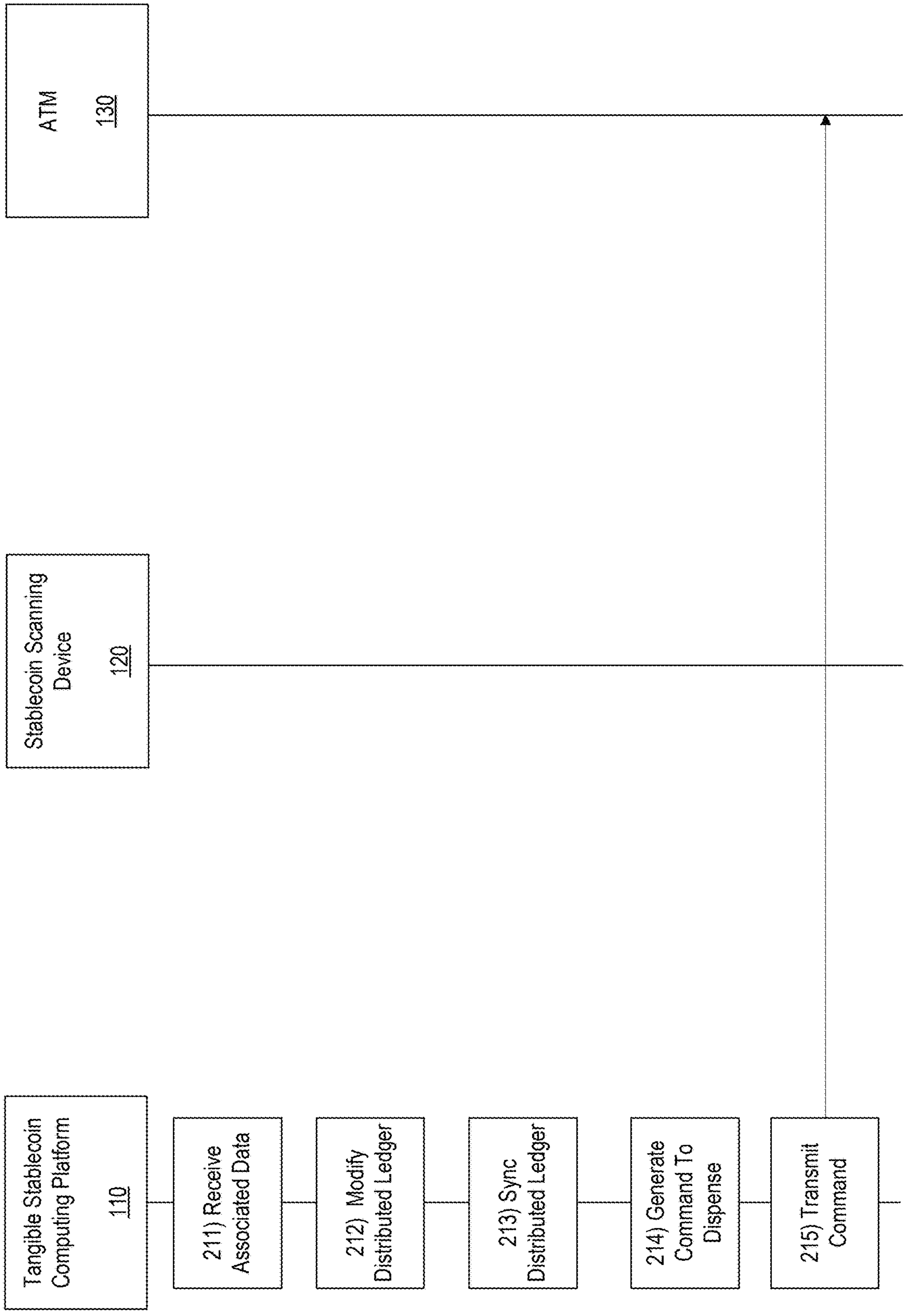

With reference to FIG. 2C, at step 211, tangible stablecoin computing platform 110 may receive the associated data sent by the ATM 130.

At step 212, tangible stablecoin computing platform 110 may modify a distributed ledger (e.g., blockchain) to include the associated data. For instance, a new block may be added to a blockchain or other distributed ledger including the associated user, unique identifier and denomination. The data may be stored in the blockchain and used to validate tangible stablecoin during a redemption process, track or trace missing stablecoin, and the like.

At step 213, in some examples, the distributed ledger may be synced with one or more other distributed ledgers. For instance, the distributed ledger may be controlled by the enterprise organization and may be synced with one or more distributed ledgers associated with a regulatory body, central financial institution, or the like. In some arrangements, an interoperability protocol may enable the distributed ledger to communicate with other distributed ledgers in order to sync the distributed ledgers. For instance, cross-chain messaging protocols may be used to sync data between the distributed ledgers. In some examples, step 213 may be optional.

At step 214, tangible stablecoin computing platform 110 may generate a command or instruction to dispense the tangible stablecoin to the requesting user.

At step 215, tangible stablecoin computing platform 110 may transmit or send the command to dispense to the ATM 130.

Figure 2D:
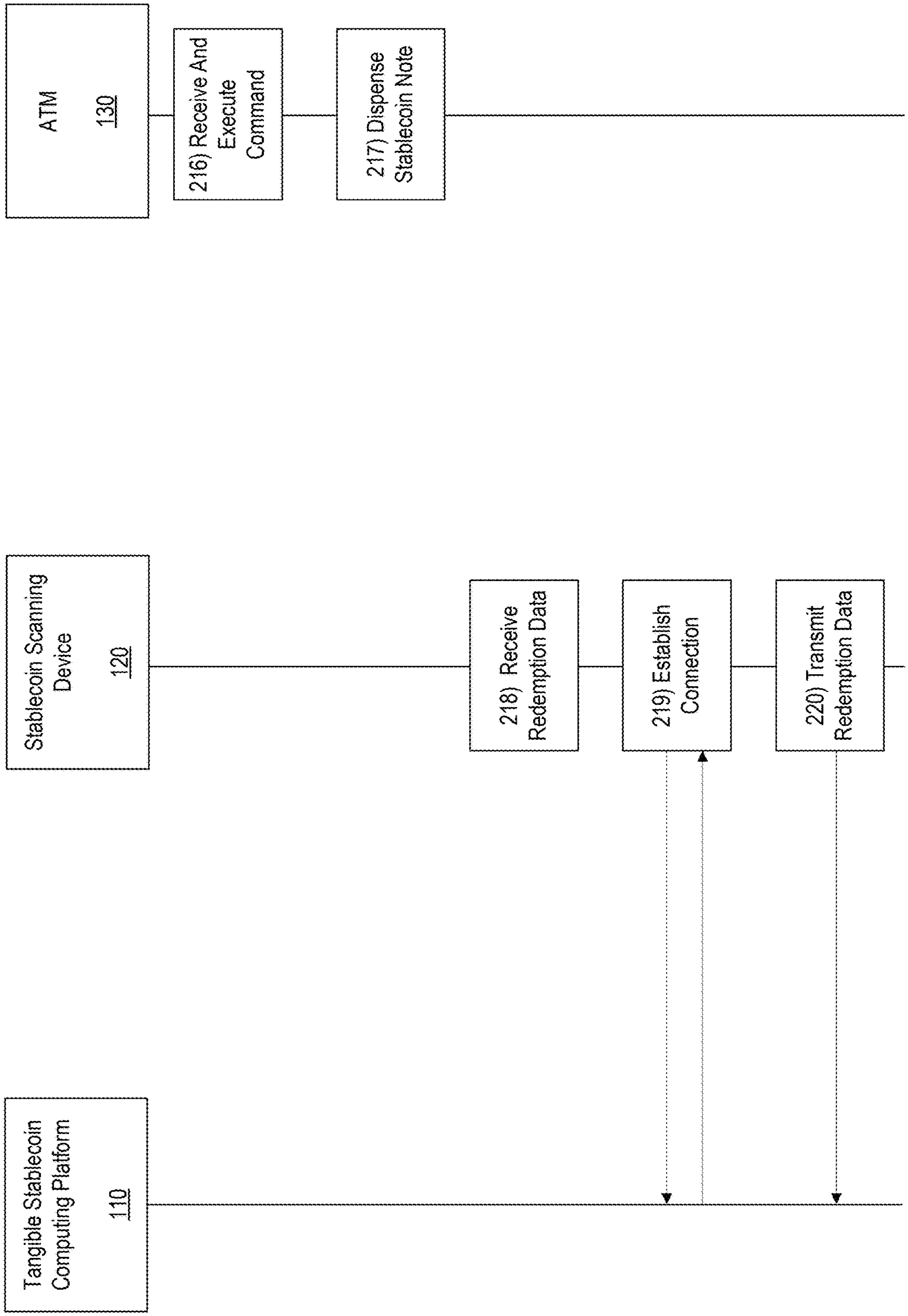

With reference to FIG. 2D, at step 216, ATM 130 may receive and execute the command to dispense the tangible stablecoin with the associated denomination to the requesting user. For instance, at step 217, ATM 130 may dispense the stablecoin note or bill to the requesting user via a dispensing slot in the ATM 130 (e.g., a slot used to dispense notes of fiat currency in a conventional ATM).

After dispensing the stablecoin note or bill to the user, the user may attempt to redeem the stablecoin note or bill at, for instance, a retailer or other location. Accordingly, at step 218, a stablecoin scanning device 120 may receive or capture redemption data. For instance, stablecoin scanning device 120 may be used to scan the unique identifier associated with the stablecoin note or bill being redeemed. The redemption data may further include a user or user identifier associated with the user attempting to redeem the note or bill, an amount associated with the transaction or an amount associated with the note or bill being redeemed, and the like.

At step 219, stablecoin scanning device 120 may connect to tangible stablecoin computing platform 110. For instance, a wireless data connection may be established between stablecoin scanning device 120 and tangible stablecoin computing platform 110. Upon establishing the wireless data connection, a communication session may be initiated between the stablecoin scanning device 120 and the tangible stablecoin computing platform 110.

At step 220, stablecoin scanning device 120 may transmit or send the redemption data to the tangible stablecoin computing platform 110. For instance, stablecoin scanning device 120 may transmit or send the redemption data during the communication session initiated upon establishing the wireless data connection.

Figure 2E:
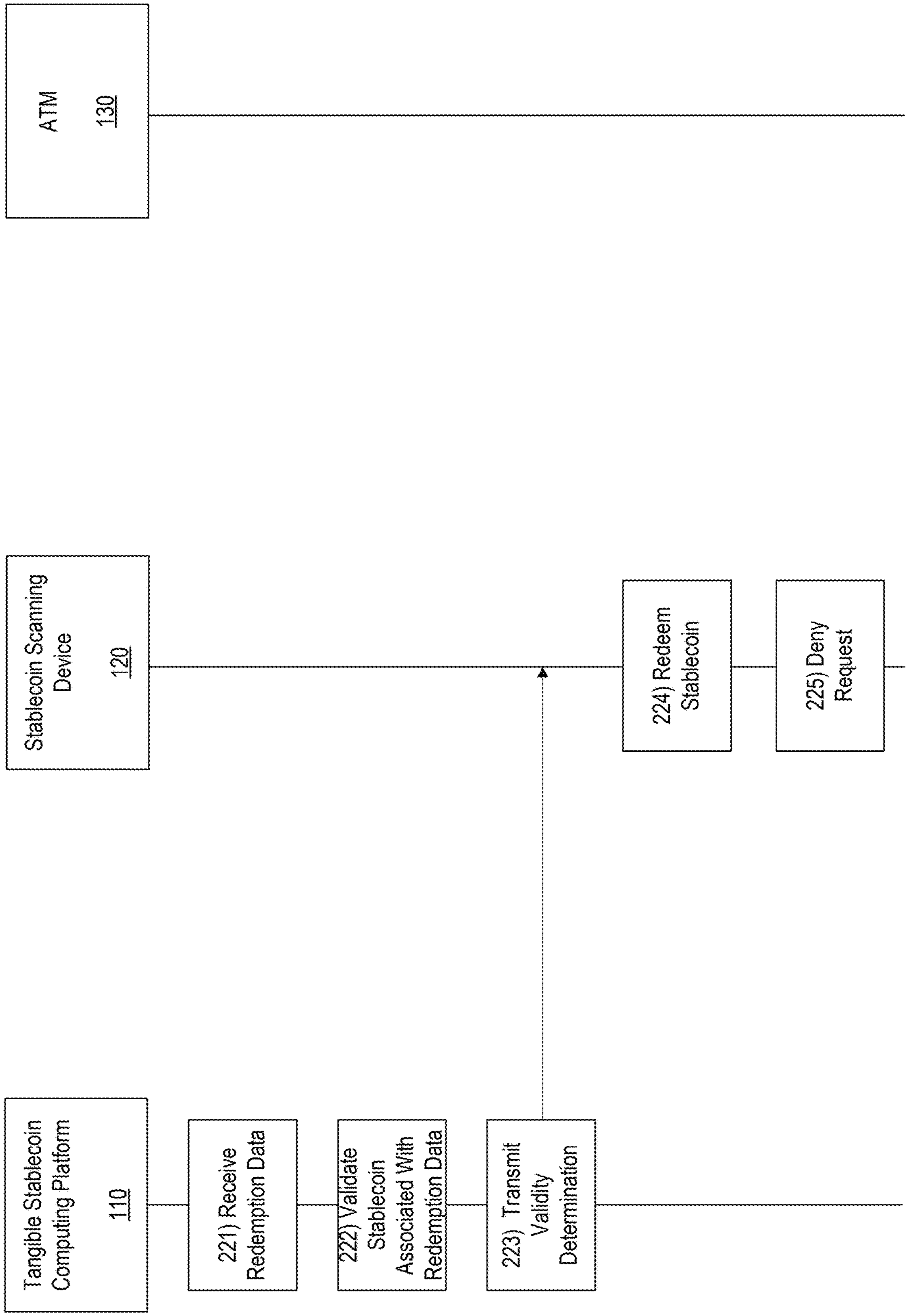

With reference to FIG. 2E, at step 221, tangible stablecoin computing platform 110 may receive the redemption data sent by the stablecoin scanning device 120.

At step 222, tangible stablecoin computing platform 110 may validate the redemption data associated with the stablecoin note or bill being redeemed. For instance, tangible stablecoin computing platform 110 may retrieve, from the distributed ledger, user data, unique identifier data and denomination data associated with the stablecoin note or bill and may compare the retrieved data to the redemption data. Tangible stablecoin computing platform 110 may validate that the user attempting to redeem the stablecoin bill or note (e.g., the user identified in the redemption data) is the user associated with the bill or note in the distributed ledger. Tangible stablecoin computing platform 110 may further determine whether the unique identifier associated with the stablecoin note or bill being redeemed corresponds to the unique identifier in the distributed ledger and that an amount or denomination of the note or bill is the same as that stored in the distributed ledger.

At step 223, tangible stablecoin computing platform 110 may transmit or send the validity determination from step 222 to the stablecoin scanning device 120.

If the stablecoin note or bill is validated, at step 224, stablecoin scanning device 120 may redeem the stablecoin note or bill. For instance, a requested transaction using the tangible stablecoin note or bill may be processed. Further, processing the transaction using the stablecoin note may cause the tangible stablecoin computing platform 110 to update or modify the distributed ledger to transfer ownership of the stablecoin bill from the user to the merchant or retailer processing the transaction. For instance, a block may be added to the distributed ledger including the unique identifier of the stablecoin bill or note, denomination of the stablecoin bill or note or amount associated with the transaction, and the merchant or retailer name or identifier now associated with the stablecoin bill or note.

If, for instance, the denomination or amount of the stablecoin bill is less than a transaction amount, additional stablecoin bills or fiat currency may be used to make up a difference. If the stablecoin amount is more than the transaction amount, in some examples, a user may be given change in the form of fiat currency, or may receive another generated stablecoin bill associated with an amount of the difference remaining between the transaction amount and the first stablecoin bill or note. The other stablecoin bill or note may be an entirely different physical note having a different unique identifier that may be associated with the user, new denomination or amount, and the like, and may be stored in the distributed ledger.

If the stablecoin note or bill is not validated, at step 225, stablecoin scanning device 120 may deny the requested transaction and may request another form of payment from the user requesting the transaction.

Figure 3:
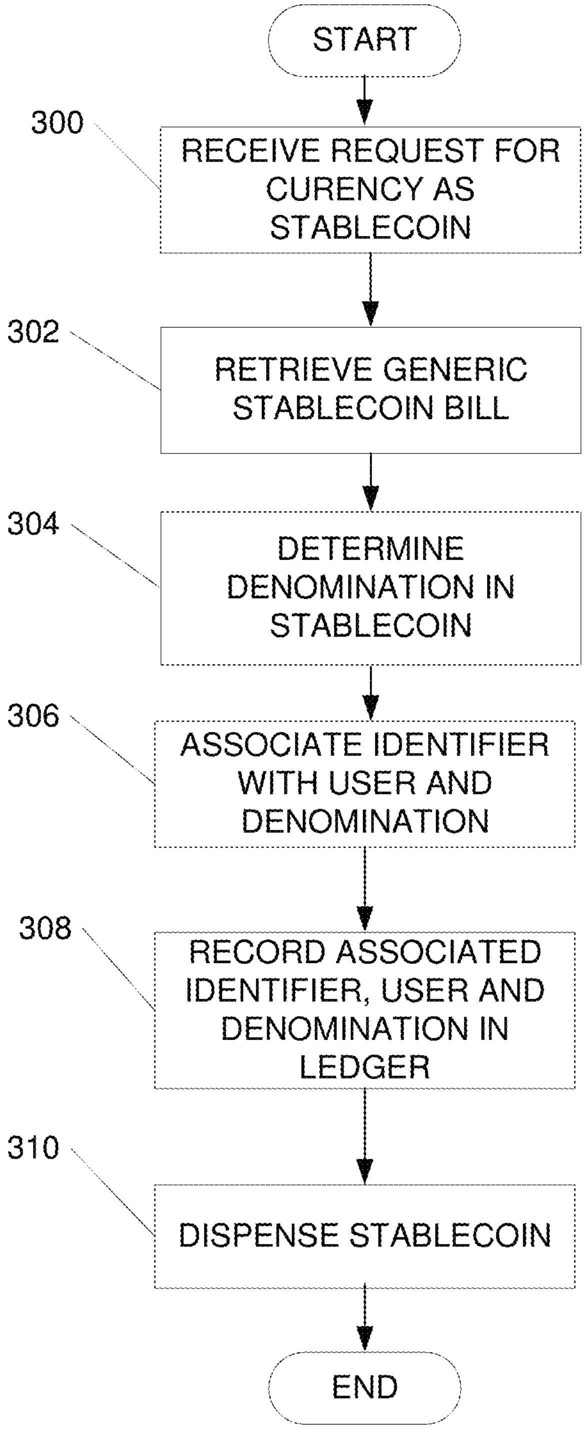
FIG. 3 illustrates an illustrative method for generating tangible stablecoin via an ATM according to one or more aspects described herein.

FIG. 3 is a flow chart illustrating one example method of generating tangible stablecoin in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, tangible stablecoin computing platform 110, which may be part of an ATM 130, may receive a request for currency in the form of stablecoin. For instance, tangible stablecoin computing platform 110 may receive, from a user, a request to dispense, via the ATM, an amount of currency in a physical stablecoin bill or note. In some examples, the currency may be identified as an amount of fiat currency to be distributed as tangible stablecoin.

At step 302, tangible stablecoin computing platform 110 may generate and transmit an instruction to the ATM 130 to retrieve, from a storage area within the ATM 130, a generic stablecoin bill. The generic stablecoin bill might not be associated with any denomination but may include a unique identifier associated with the bill that may be machine-readable.

At step 304, tangible stablecoin computing platform 110 may determine a corresponding denomination of stablecoin. For instance, tangible stablecoin computing platform 110 may determine an amount of stablecoin corresponding to the requested amount of fiat currency.

At step 306, tangible stablecoin computing platform 110 may associate the identifier of the generic stablecoin bill with the determined denomination of stablecoin and the user requesting the stablecoin to generate a labeled stablecoin bill or note.

At step 308, tangible stablecoin computing platform 110 may store, in a distributed ledger, the unique identifier of the labeled stablecoin bill and associated denomination and user. For instance, tangible stablecoin computing platform 110 may update the distributed ledger by adding a block corresponding to the unique identifier, denomination, and user associated with the labeled stablecoin bill. In some examples, the updated distributed ledger may be synced with one or more additional distributed ledgers (e.g., from a central financial institution or regulator body).

At step 310, responsive to an instruction from tangible stablecoin computing platform 110, ATM 130 may distribute or dispense the tangible stablecoin bill with the associated denomination to the requesting user. For instance, the tangible stablecoin bill may be dispensed to the user of the ATM 130 via, for instance, a bill dispensing slot used to dispense fiat currency as well.

In some examples, the labeled stablecoin bill may be redeemed at a retailer, merchant or the like. For instance, a scanning device at the retailer may capture redemption data including the unique identifier, user attempting to redeem the labeled stablecoin bill, denomination and amount of transaction, and may transmit the redemption to the tangible stablecoin computing platform 110 for validation. Tangible stablecoin computing platform 110 may retrieve, from the distributed ledger, data associated with the labeled stablecoin bill and may validate the stablecoin bill for redemption by comparing the redemption data to the retrieved data. If the bill is validated, the transaction may be processed. If not, the transaction may be denied. In some examples, if the bill is validated, the distributed ledger may be further modified to transfer ownership of the labeled stablecoin bill to the retailer or merchant. For instance, an additional block may be added including the unique identifier, denomination and merchant or retailer name or identified.

Accordingly, aspects described herein provide for tangible, physical stablecoin bills to be minted by an ATM, such as a conventional ATM also configured to receive and dispense fiat currency, on demand and as requested by a user in any denomination. The tangible stablecoin bills may then be used in a manner similar to fiat currency to make purchases, and the like, but are traceable back to a user associated with the particular tangible stablecoin bill.

Although aspects discussed herein are directed to generation of a stablecoin bill or note, in some examples, the physical stablecoin may be in the form of a coin or physical token. Further, a value of stablecoin as used herein may be made equal to any particular asset (e.g., one stablecoin may equal one unit of any desired asset).

Figure 5:
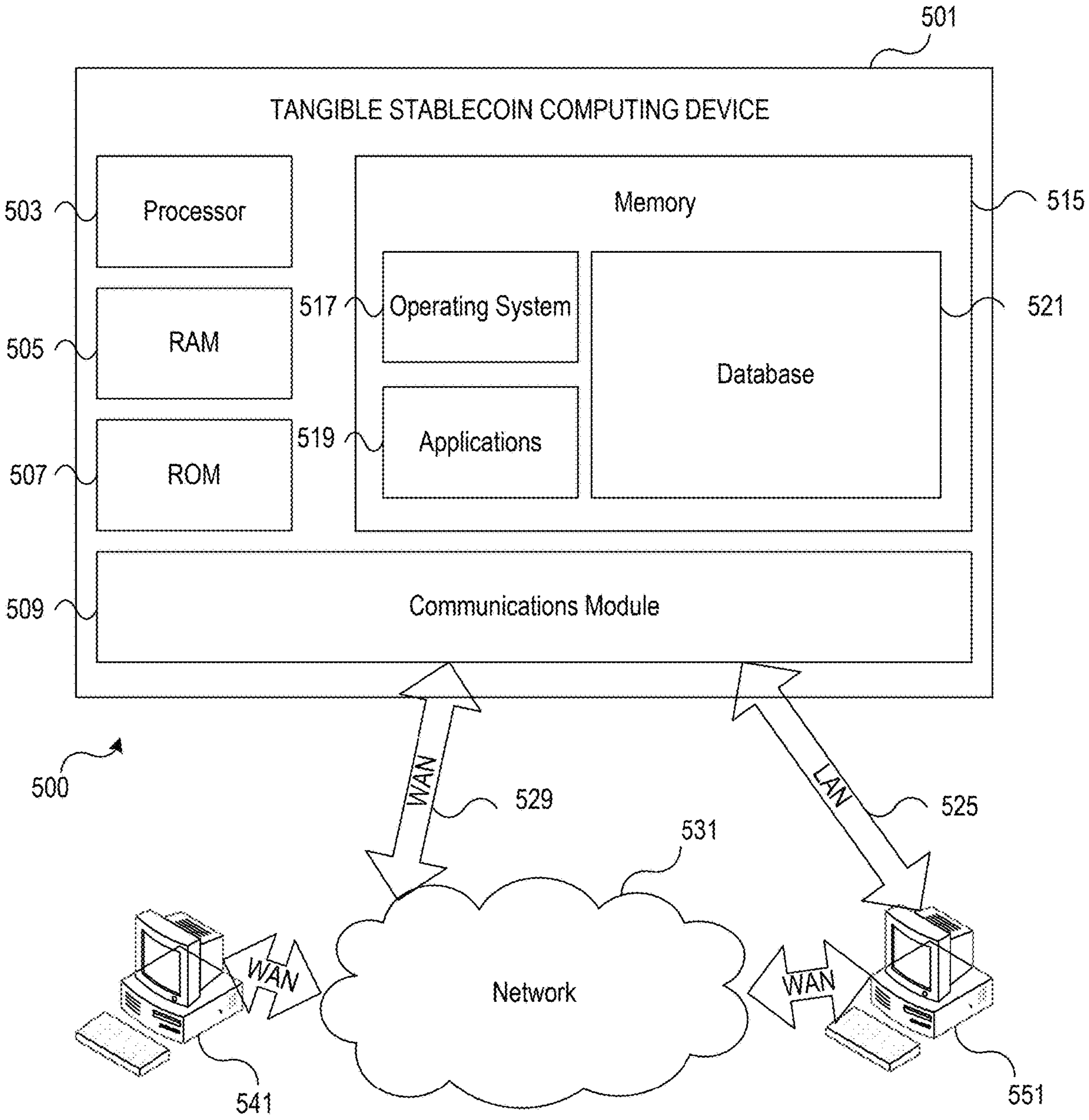
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include tangible stablecoin computing device 501 having processor 503 for controlling overall operation of tangible stablecoin computing device 501 and its associated components, including Random Access Memory (RAM) 505, Read-Only Memory (ROM) 507, communications module 509, and memory 515. Tangible stablecoin computing device 501 may include a variety of computer readable media. Computer readable media may be any available media that may be accessed by tangible stablecoin computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by tangible stablecoin computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor (e.g., hardware processor) on tangible stablecoin computing device 501. Such a processor may execute computer-executable instructions stored on a computer-readable medium.

Software may be stored within memory 515 and/or storage to provide instructions to processor 503 for enabling tangible stablecoin computing device 501 to perform various functions as discussed herein. For example, memory 515 may store software used by tangible stablecoin computing device 501, such as operating system 517, application programs 519, and associated database 521. Also, some or all of the computer executable instructions for tangible stablecoin computing device 501 may be embodied in hardware or firmware. Although not shown, RAM 505 may include one or more applications representing the application data stored in RAM 505 while tangible stablecoin computing device 501 is on and corresponding software applications (e.g., software tasks) are running on tangible stablecoin computing device 501.

Communications module 509 may include a microphone, keypad, touch screen, and/or stylus through which a user of tangible stablecoin computing device 501 may provide input, and may also include one or more of a speaker for providing audio output and a video display device for providing textual, audiovisual and/or graphical output. Computing system environment 500 may also include optical scanners (not shown).

Tangible stablecoin computing device 501 may operate in a networked environment supporting connections to one or more remote computing devices, such as computing devices 541 and 551. Computing devices 541 and 551 may be personal computing devices or servers that include any or all of the elements described above relative to device evaluation computing device 701.

The network connections depicted in FIG. 5 may include Local Area Network (LAN) 525 and Wide Area Network (WAN) 529, as well as other networks. When used in a LAN networking environment, tangible stablecoin computing device 501 may be connected to LAN 525 through a network interface or adapter in communications module 509. When used in a WAN networking environment, tangible stablecoin computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:
receive, from a user, a request to dispense an amount of currency in a stablecoin bill;
retrieve, from a storage area, a generic stablecoin bill, wherein the generic stablecoin bill includes a machine-readable unique identifier and does not include a denomination associated with the generic stablecoin bill;
determine a denomination of stablecoin to dispense based on the requested amount of currency;
associate the determined denomination of stablecoin with the retrieved generic stablecoin bill and the machine-readable unique identifier to generate a labeled stablecoin bill;
store, in a distributed ledger of an enterprise organization, the machine-readable unique identifier of the generated labeled stablecoin bill with a user identifier associated with the user and the determined denomination; and
dispense the generated labeled stablecoin bill to the user.

2. The computing platform of claim 1, wherein the computing platform further includes an automated teller machine (ATM) and wherein the labeled stablecoin bill is dispensed through a dispensing slot of the ATM also used to dispense fiat currency.

3. The computing platform of claim 1, wherein the amount of currency includes an amount of fiat currency.

4. The computing platform of claim 3, wherein determining the denomination of stablecoin to dispense based on the requested amount of currency includes determining, based on the amount of fiat currency, a corresponding amount of stablecoin to dispense.

5. The computing platform of claim 1, wherein the stablecoin bill is a physical bill.

6. The computing platform of claim 1, further including instructions that, when executed, cause the computing platform to:
receive, from a merchant stablecoin scanning device, a request to redeem the labeled stablecoin bill, the request including redemption data;
retrieve, from the distributed ledger, data associated with the labeled stablecoin bill;
validate the stablecoin bill and associated request based on comparing the redemption data to the retrieved data associated with the labeled stablecoin bill;
responsive to validating the labeled stablecoin bill, transmit an instruction to the merchant stablecoin scanning device to authorize redemption of the labeled stablecoin bill; and
responsive to not validating the labeled stablecoin bill, transmit an instruction to the merchant stablecoin scanning device to deny redemption of the labeled stablecoin bill.

7. The computing platform of claim 6, further including instructions that, when executed, cause the computing platform to:
responsive to validating the labeled stablecoin bill, modify the distributed ledger to add a block associating the labeled stablecoin bill, associated denomination and machine-readable unique identifier with a merchant associated with the merchant stablecoin scanning device.

8. The computing platform of claim 6, wherein the merchant stablecoin scanning device includes an application associated with the enterprise organization executing on the merchant stablecoin scanning device.

9. The computing platform of claim 6, wherein the merchant stablecoin scanning device is a point-of-sale device.

10. The computing platform of claim 1, further including instructions that, when executed, cause the computing platform to sync the distributed ledger with another distributed ledger associated with a regulatory body.

11. A method, comprising:
receiving, by a computing platform, the computing platform having at least one processor, and memory, and from a user, a request to dispense an amount of currency in a stablecoin bill;
retrieve, from a storage area, a generic stablecoin bill, wherein the generic stablecoin bill includes a machine-readable unique identifier and does not include a denomination associated with the generic stablecoin bill;
determining, by the at least one processor, a denomination of stablecoin to dispense based on the requested amount of currency;
associating, by the at least one processor, the determined denomination of stablecoin with the retrieved generic stablecoin bill and the machine-readable unique identifier to generate a labeled stablecoin bill;
storing, in a distributed ledger of an enterprise organization, the machine-readable unique identifier of the generated labeled stablecoin bill with a user identifier associated with the user and the determined denomination; and
dispensing the generated labeled stablecoin bill to the user.

12. The method of claim 11, wherein the computing platform further includes an automated teller machine (ATM) and wherein the labeled stablecoin bill is dispensed through a dispensing slot of the ATM also used to dispense fiat currency.

13. The method of claim 11, wherein the amount of currency includes an amount of fiat currency.

14. The method of claim 13, wherein determining the denomination of stablecoin to dispense based on the requested amount of currency includes determining, based on the amount of fiat currency, a corresponding amount of stablecoin to dispense.

15. The method of claim 11, wherein the stablecoin bill is a physical bill.

16. The method of claim 11, further including:
receiving, by the at least one processor and from a merchant stablecoin scanning device, a request to redeem the labeled stablecoin bill, the request including redemption data;
retrieving, by the at least one processor and from the distributed ledger, data associated with the labeled stablecoin bill;
validating, by the at least one processor, the stablecoin bill and associated request based on comparing the redemption data to the retrieved data associated with the labeled stablecoin bill;
responsive to validating the labeled stablecoin bill, transmitting, by the at least one processor, an instruction to the merchant stablecoin scanning device to authorize redemption of the labeled stablecoin bill; and
responsive to not validating the labeled stablecoin bill, transmitting, by the at least one processor, an instruction to the merchant stablecoin scanning device to deny redemption of the labeled stablecoin bill.

17. The method of claim 16, further including:

responsive to validating the labeled stablecoin bill, modifying the distributed ledger to add a block associating the labeled stablecoin bill, associated denomination and machine-readable unique identifier with a merchant associated with the merchant stablecoin scanning device.

18. The method of claim 16, wherein the merchant stablecoin scanning device includes an application associated with the enterprise organization executing on the merchant stablecoin scanning device.

19. The method of claim 16, wherein the merchant stablecoin scanning device is a point-of-sale device.

20. One or more non-transitory computer-readable media storing instructions that, when executed by a computing platform comprising at least one processor, memory, and a communication interface, cause the computing platform to:

receive, from a user, a request to dispense an amount of currency in a stablecoin bill;

retrieve, from a storage area, a generic stablecoin bill, wherein the generic stablecoin bill includes a machine-readable unique identifier and does not include a denomination associated with the generic stablecoin bill;

determine the denomination of stablecoin to dispense based on the requested amount of currency;

associate the determined denomination of stablecoin with the retrieved generic stablecoin bill and the machine-readable unique identifier to generate a labeled stablecoin bill;

store, in a distributed ledger of an enterprise organization, the machine-readable unique identifier of the generated labeled stablecoin bill with a user identifier associated with the user and the determined denomination; and dispense the generated labeled stablecoin bill to the user.

* * * * *